(12) United States Patent
Wang et al.

(10) Patent No.: US 11,248,377 B1
(45) Date of Patent: Feb. 15, 2022

(54) PLASTIC PANEL

(71) Applicants: Chen Lu Wang, Douliu (TW); Chao Kai Wang, Douliu (TW)

(72) Inventors: Chen Lu Wang, Douliu (TW); Chao Kai Wang, Douliu (TW)

( * ) Notice: Subject to any disclaimer, the term of this patent is extended or adjusted under 35 U.S.C. 154(b) by 0 days.

(21) Appl. No.: 17/181,705

(22) Filed: Feb. 22, 2021

(51) Int. Cl.
*E04D 3/32* (2006.01)
*E04D 3/362* (2006.01)
*F16B 5/00* (2006.01)

(52) U.S. Cl.
CPC .............. *E04D 3/32* (2013.01); *E04D 3/362* (2013.01); *F16B 5/0012* (2013.01)

(58) Field of Classification Search
CPC .......... E04D 3/32; E04D 3/362; F16B 5/0012
See application file for complete search history.

(56) References Cited

U.S. PATENT DOCUMENTS

| 5,050,362 | A | * | 9/1991 | Tai | .......................... | E04F 13/18 |
| | | | | | | 52/588.1 |
| 9,200,445 | B2 | * | 12/2015 | Leines | .................... | E04F 15/04 |

FOREIGN PATENT DOCUMENTS

| TW | M380972 U | 5/2010 |
| TW | M490494 U | 11/2014 |
| TW | I506189 B | 11/2015 |

* cited by examiner

*Primary Examiner* — Patrick J Maestri
(74) *Attorney, Agent, or Firm* — Muncy, Geissler, Olds & Lowe, P.C.

(57) ABSTRACT

A plastic panel includes a middle portion. Two opposing sides of the middle portion are defined as a first engaging portion and a second engaging portion, respectively. Each engaging portion has a concave portion, a convex portion, a protruding portion and a recess portion. Two adjacent plastic panels can be firmly connected through their concave portions, convex portions, protruding portions and recess portions. Besides, two adjacent plastic panels facing up or facing down can be engaged and connected with each other.

3 Claims, 7 Drawing Sheets

PLASTIC PANEL

FIELD OF THE INVENTION

The present invention relates to a building material, and more particularly to a plastic panel.

BACKGROUND OF THE INVENTION

The roof of a simple building, such as a shed, is composed of multiple panels. The panels are usually modularized to facilitate calculation, usage and construction. Conventional modular panels have many shapes and structures, as disclosed in Taiwan Utility Model Publication No. M490494, M380972 and Taiwan Patent No. 1506189, etc. Both sides of the panel are provided with engaging portions, so that two adjacent plates are connected to each other through the engaging portions. However, in the above-mentioned conventional structures, the panel defines a front and a back. Two adjacent panels can only be connected to each other when the fronts of the two panels face up. When one panel faces up and the other panel faces down, the engaging portions of the two panels cannot correspond in shape to each other to be connected. Therefore, it is required to pay attention to the orientation of the panel during construction. This is time-consuming. On the other hand, due to the modular production of the panels, the restrictions on the orientation of the panels also limit the functionality of the panels.

Accordingly, the inventor of the present invention has devoted himself based on his many years of practical experiences to solve these problems.

SUMMARY OF THE INVENTION

The primary object of the present invention is to provide a plastic panel, which has two engaging portions on both sides thereof. The engaging portions are properly designed so that two adjacent plastic panels facing up or facing down can be engaged and connected with each other. Accordingly, the application can be selected according to the space and environmental conditions. The functionality of the plastic panel is improved.

Another object of the present invention is to provide a plastic panel, which can effectively prevent rainwater from intruding through convex and concave portions of the two engaging portions to be engaged with each other.

In order to achieve the above objects, the present invention provides a plastic panel, comprising a middle portion. The middle portion has a first face and a second face parallel to the first face. The first face is a flat face. The second face is provided with a plurality of grooves. Two opposing sides of the middle portion are defined as a first engaging portion and a second engaging portion, respectively. The first engaging portion includes a first extension section extending from the first face and a first side wall. An end of the first extension section has a first concave portion and a first convex portion. The first side wall has a first protruding portion. A first recess portion is formed between the first protruding portion and the first extension section. The second engaging portion includes a second extension section extending from the second face and a second side wall. An end of the second extension section has a second concave portion and a second convex portion. The second side wall has a second protruding portion. A second recess portion is formed between the second protruding portion and the second extension section. The second convex portion and the second protruding portion are located on a same axis as the first concave portion and the first recess portion. The second concave portion and the second recess portion are located on a same axis as the first convex portion and the first protruding portion.

Preferably, the first extension section and the second extension section each have a notch, and the notch has a V-shaped bottom.

Preferably, the middle portion has a hollow room therein, and the hollow room is provided with a plurality of supporting ribs.

DETAILED DESCRIPTION OF THE PREFERRED EMBODIMENTS

Embodiments of the present invention will now be described, by way of example only, with reference to the accompanying drawings.

Figure 1:
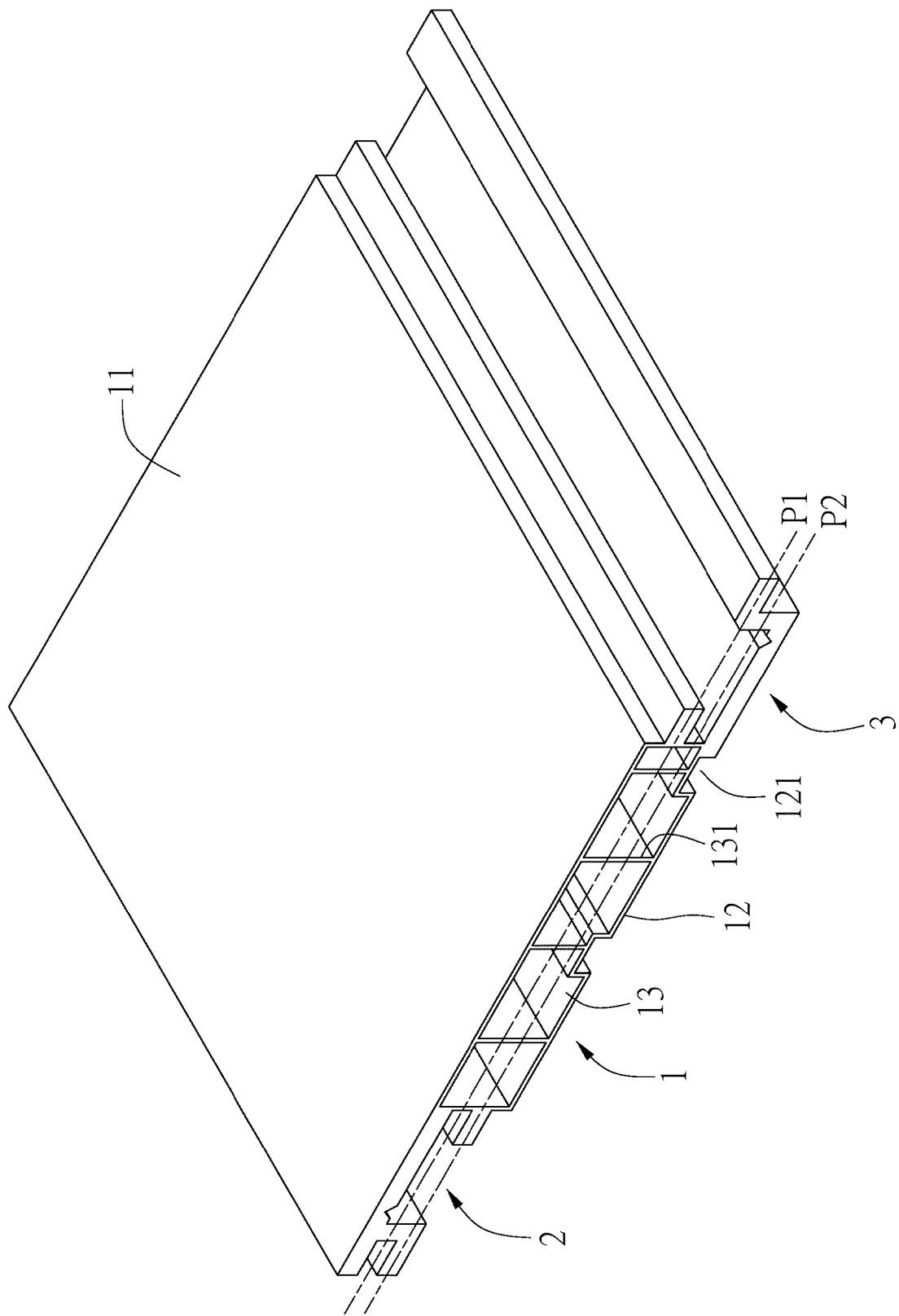
FIG. 1 and FIG. 2 are perspective views of the present invention.
Figure 2:
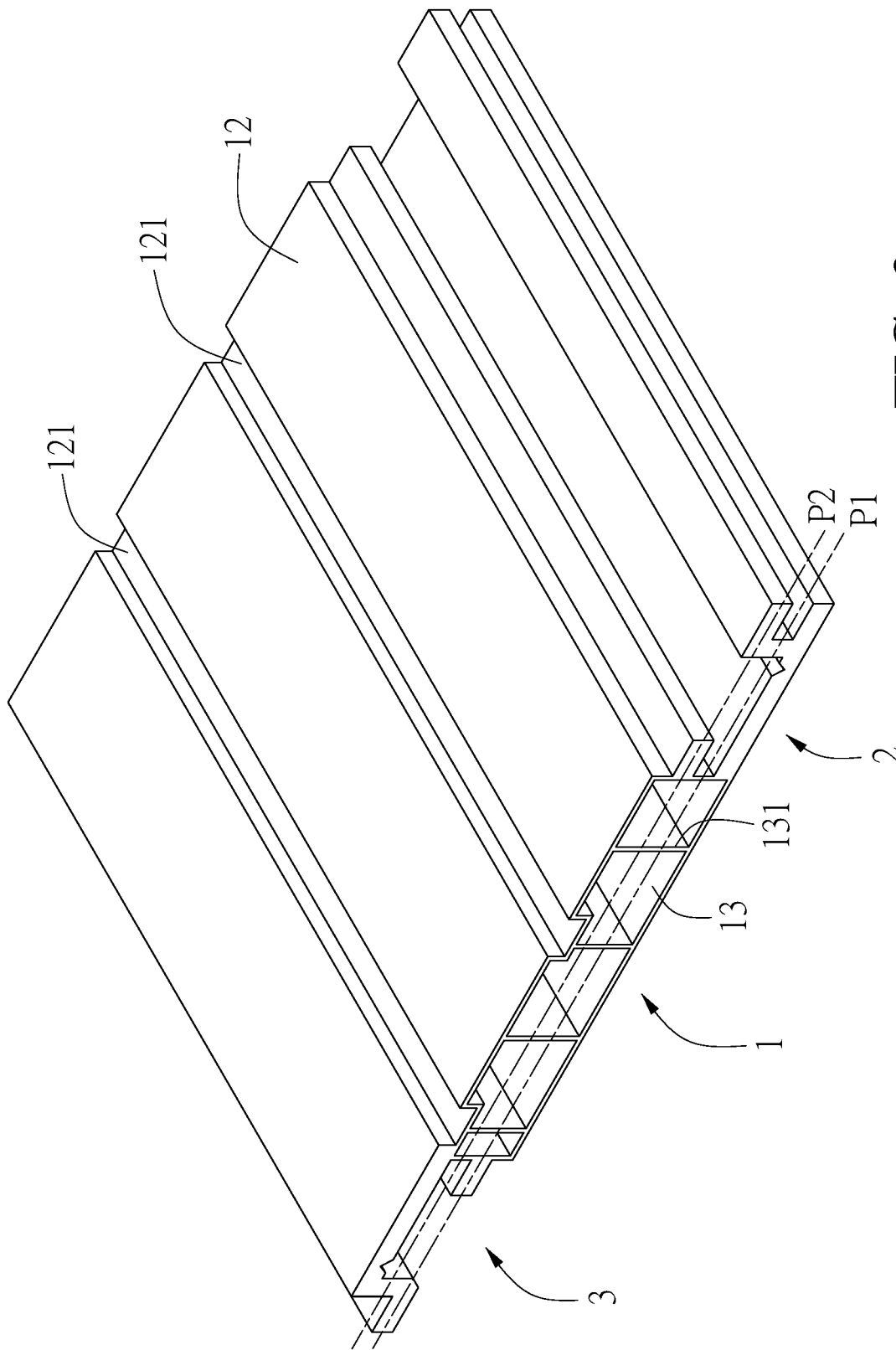

Referring to FIG. 1 and FIG. 2, the present invention discloses a plastic panel, comprising a middle portion 1. The middle portion 1 has a first face 11 and a second face 12 parallel to the first face 11. The first face 11 is a flat face. The second face 12 is provided with a plurality of grooves 121. The grooves 121 are used for drainage or for increasing decoration. Two opposing sides of the middle portion 1 are defined as a first engaging portion 2 and a second engaging portion 3, respectively. The middle portion 1 has a hollow room 13 with two open ends, thereby achieving a ventilation effect. The hollow room 13 is provided with a plurality of supporting ribs 131 to strengthen the structure.

Figure 3:
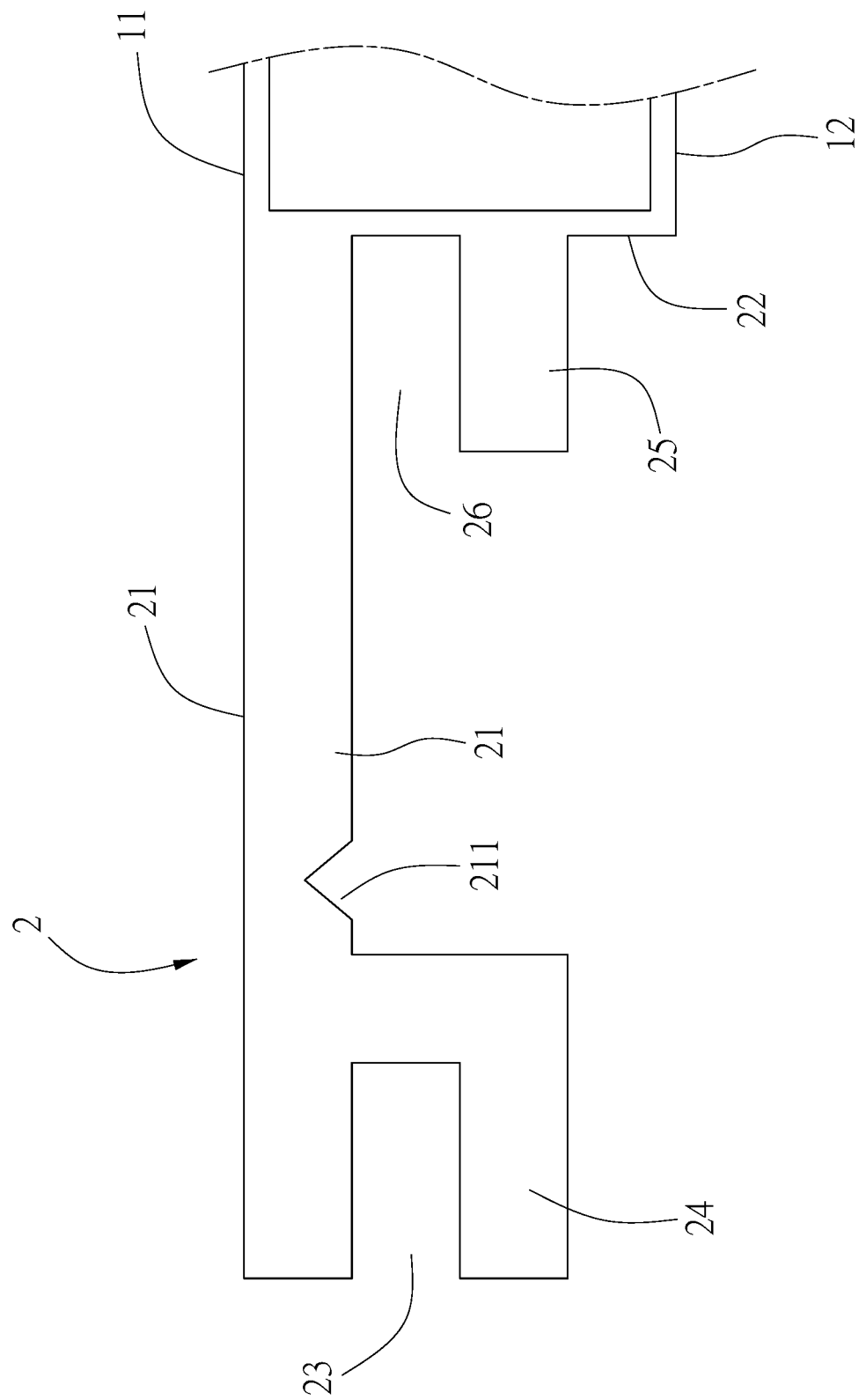
FIG. 3 and FIG. 4 are partial planar views of the present invention.

As shown in FIG. 3, the first engaging portion 2 includes a first extension section 21 extending from the first face 11 and a first side wall 22. The first extension section 21 extends horizontally, outwardly from the first face 11. The first side wall 22 extends vertically from the first extension section 21 to the second face 12. The end of the first extension section 21 has a first concave portion 23 and a first convex portion 24. The first side wall 22 has a first protruding portion 25. A first recess portion 26 is formed between the first protruding portion 25 and the first extension section 21.

Figure 5:
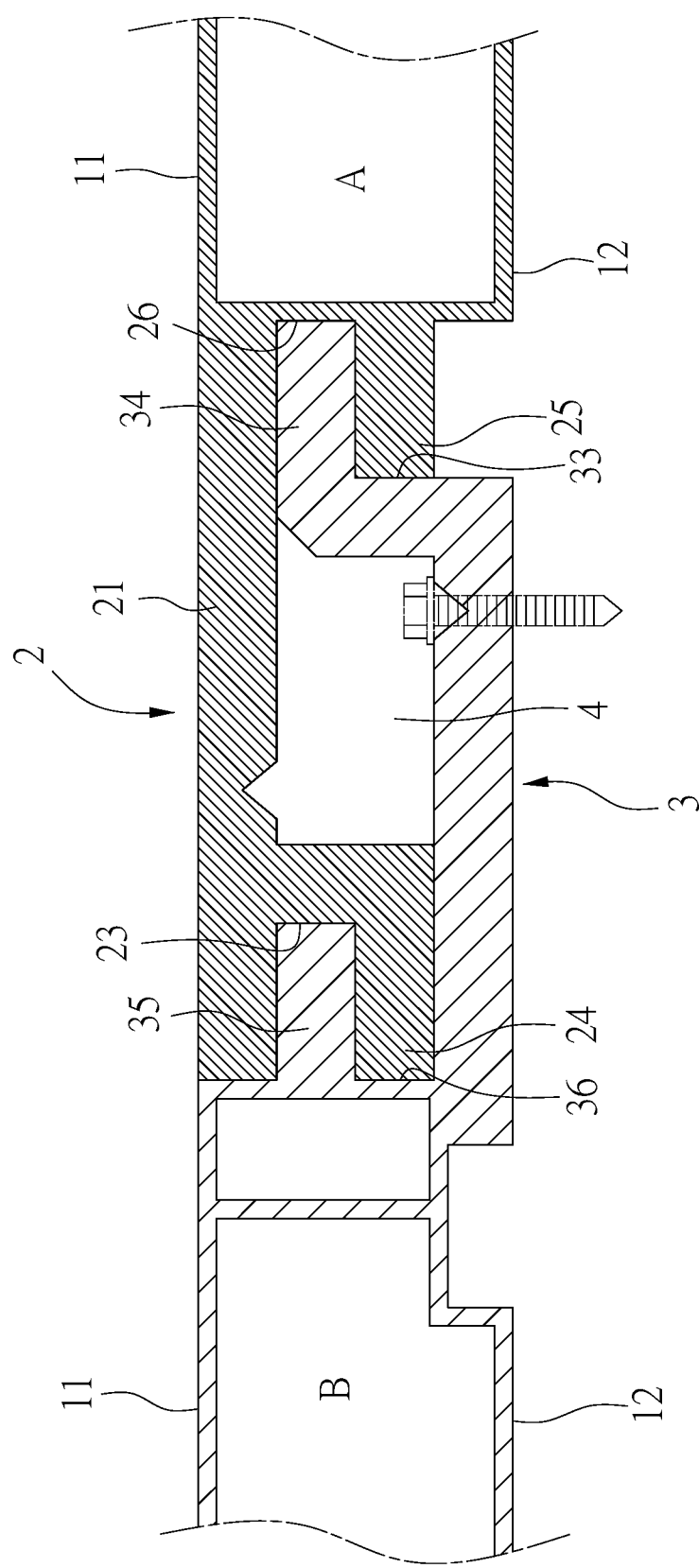
FIGS. 5-7 are schematic views of the present invention when in use.

The first extension section 21 has a first notch 211 for an object to be fixed thereon with a screw. As shown in FIG. 5, in this embodiment, the first notch 211 has a V-shaped bottom for positioning the screw.

Figure 4:
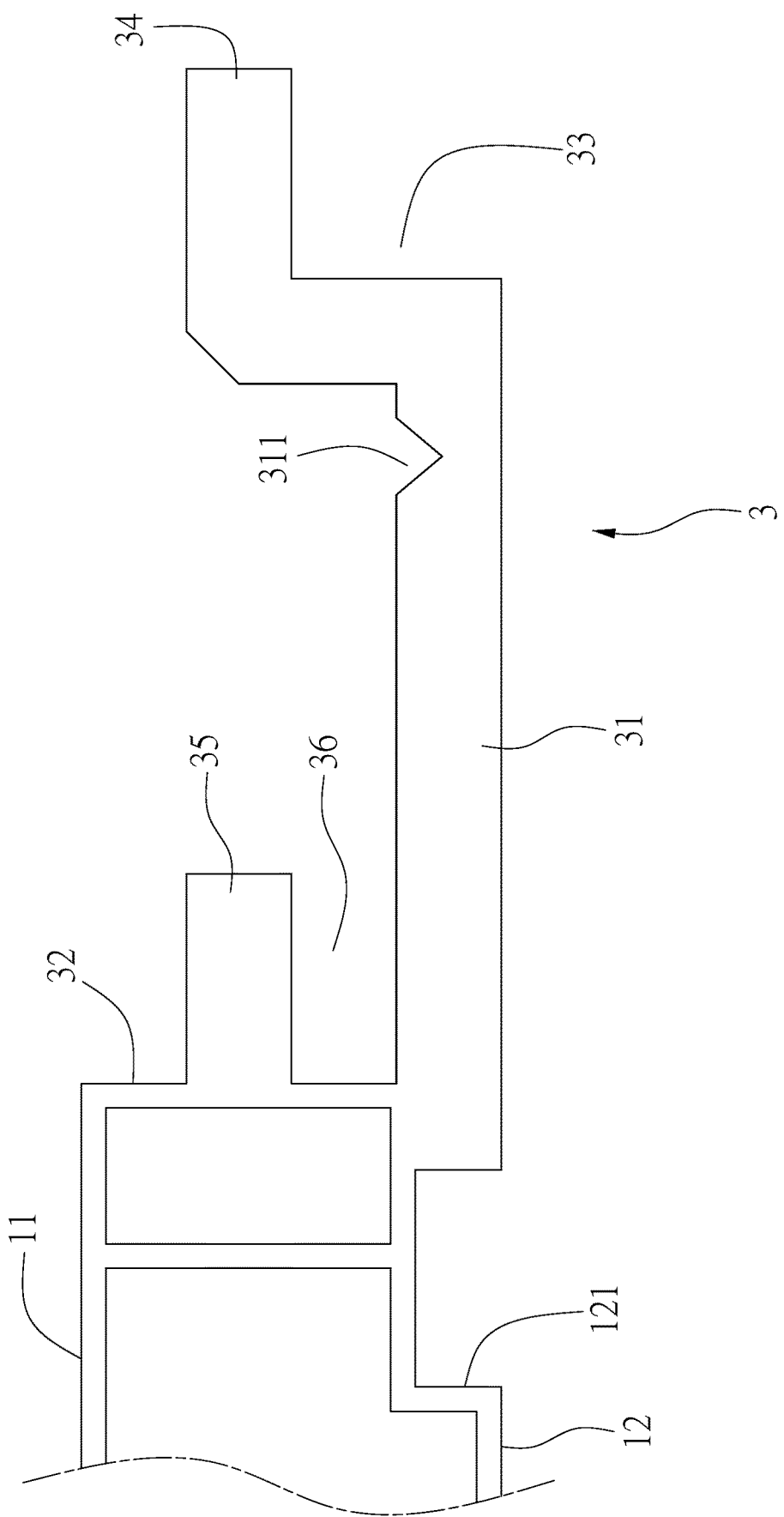

As shown in FIG. 4, the second engaging portion 3 includes a second extension section 31 extending from the second face 12 and a second side wall 32. The second extension section 31 extends horizontally, outwardly from the second face 12. The second side wall 32 extends vertically from the second extension section 31 to the first face 11. The end of the second extension section 31 has a second concave portion 33 and a second convex portion 34. The second side wall 32 has a second protruding portion 35. A second recess portion 36 is formed between the second protruding portion 35 and the second extension section 31. The second convex portion 34 and the second protruding portion 35 are located on the same axis P1 parallel to the first face 11 and the second face 12 as the first concave portion 23 and the first recess portion 26. The second concave portion 33 and the second recess portion 36 are located on the same axis P2 parallel to the first face 11 and the second face 12 as the first convex portion 24 and the first protruding portion 25. As shown in FIG. 1 and FIG. 2, the second extension section 31 also has a second V-shaped notch 311.

In actual use, when two adjacent plastic panels A, B are arranged with their top faces 11 facing up as shown in FIG. 5, the first engaging portion 2 of the plastic panel A is engaged and connected with the second engaging portion 3 of the plastic panel B. In detail, the first concave portion 23 and the first convex portion 24 at the end of the first extension section 21 of the plastic panel A are engaged with the second protruding portion 35 and the second recess portion 36 of the plastic panel B. The first protruding portion 25 and the first recess portion 26 of the plastic panel A are engaged with the second concave portion 33 and the second convex portion 34, so that the plastic panel A is tightly engaged and connected with the plastic panel B.

Figure 6:
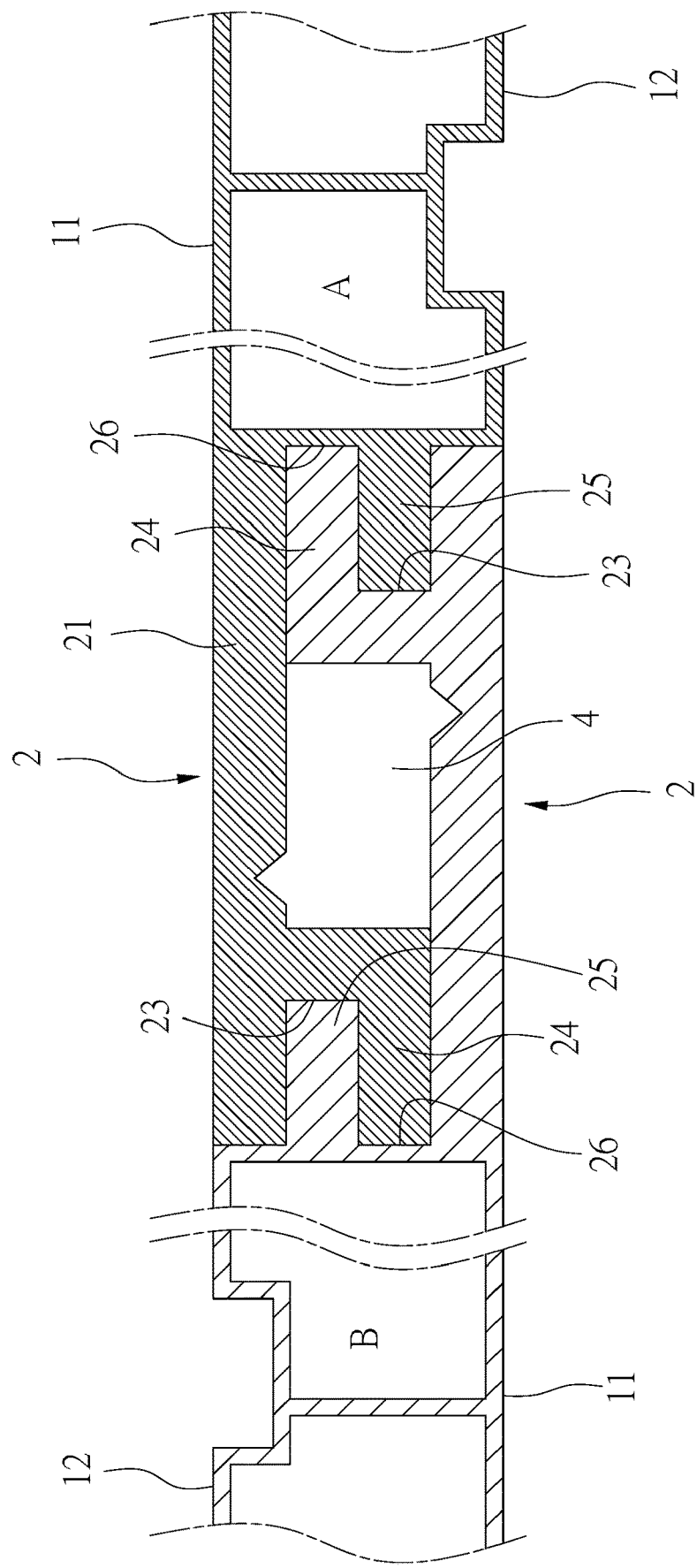

In another example of use, when two adjacent plastic panels A, B are arranged with the top face 11 of the plastic panel A facing up and the top face 11 of the plastic panel B facing down as shown in FIG. 6, the first engaging portion 2 of the plastic panel A is engaged and connected with the first engaging portion 2 of the plastic panel B. In detail, the first concave portion 23 and the first convex portion 24 at the end of the first extension section 21 of the plastic panel A are engaged with the first protruding portion 25 and the first recess portion 26 of the plastic panel B. The first protruding portion 25 and the first recess portion 26 of the plastic panel A are engaged with the first concave portion 23 and the first convex portion 24 of the plastic panel B, so that the plastic panel A is tightly engaged and connected with the plastic panel B.

Figure 7:
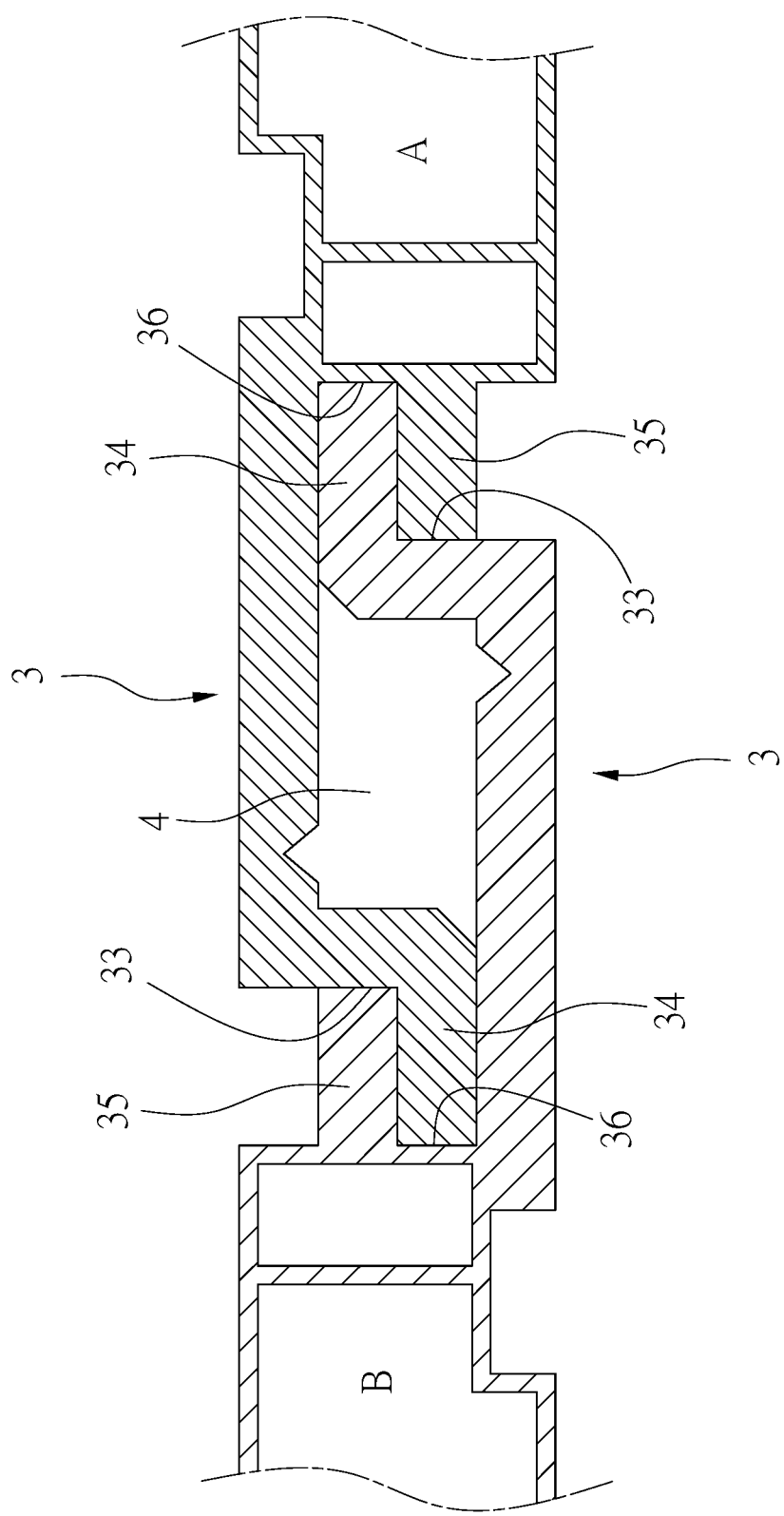

When two adjacent plastic panels A, B are arranged with the top face 11 of the plastic panel A facing up and the top face 11 of the plastic panel B facing down as shown in FIG. 7, the second engaging portion 3 of the plastic panel A is engaged and connected with the second engaging portion 3 of the plastic panel B. In detail, the second concave portion 33 and the second convex portion 34 of the plastic panel A are engaged with the second concave portion 33 and the second convex portion 34 of the plastic panel B. The second protruding portion 35 and the second recess portion 36 of the plastic panel A are engaged with the second protruding portion 35 and the second recess portion 36 of the plastic panel B, so that the plastic panel A is tightly engaged and connected with the plastic panel B.

When two engaging portions of two plastic panels are engaged with each other, that is, the first engaging portion 2 is engaged with the second engaging portion 3, or the first engaging portion 2 is engaged with the first engaging portion 2, or the second engaging portion 3 is engaged with the second engaging portion 3, the plastic panel A is tightly engaged and connected with the plastic panel B. When the two engaging portions of the two plastic panels are engaged with each other, a channel 4 is formed between the extension sections. The channel can facilitate the installation of wires and other lines, and can be used as a ventilation channel.

As the foregoing description, it can be understood that by the complementary shape of the left and right engaging portions 2, 3 of the plastic panel of the present invention and the structure on the same axis, two adjacent plastic panels facing up or facing down can be engaged and connected with each other. Accordingly, the application can be selected according to the space and environmental conditions. For example, in a situation where drainage is important, the top faces of the plastic panels may face down, or the top faces of some of the plastic panels may face up and the top faces of the other plastic panels may face down, so that the grooves on the bottom faces up to facilitate drainage for the built roof. For example, in a situation where decoration is emphasized, the top faces of all the plastic panels face up, so that the built roof will be flat and beautiful.

Furthermore, since the plastic panel of the present invention is produced in a modular structure, the top face and the bottom face have different shapes, respectively. Through the feature of the present invention that the engaging portions of the plastic panels facing up or facing down can be engaged and connected with each other, the functionality of the plastic panels is improved, and there is no need to produce modules with different shapes.

Furthermore, due to the structure of the extension section of the engaging portion of the plastic panel of the present invention, the plastic panel can be fixed to the beam and column by a fixing member passing through the notch of the extension section. When the two engaging portions are engaged with each other, the channel formed between the extension sections of the two engaging portions can accommodate the fixing member.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:
1. A plastic panel, comprising:
a middle portion, having a first face and a second face parallel to the first face, the first face and the second face having different surface features; two opposing sides of the middle portion being defined as a first engaging portion and a second engaging portion, respectively;
the first engaging portion including a first extension section extending from the first face and a first side wall, an end of the first extension section having a first concave portion and a first convex portion, the first side wall having a first protruding portion, a first recess portion being formed between the first protruding portion and the first extension section;
the second engaging portion including a second extension section extending from the second face and a second side wall, an end of the second extension section having a second concave portion and a second convex portion, the second side wall having a second protruding portion, a second recess portion being formed between the second protruding portion and the second extension section, the second convex portion and the second protruding portion being located on a same axis as the first concave portion and the first recess portion, the second concave portion and the second recess portion being located on a same axis as the first convex portion and the first protruding portion,
wherein the first extension section and the second extension section each have a notch, and
wherein the notch has a V-shaped bottom.
2. The plastic panel as claimed in claim 1, wherein the surface feature of the first face is a flat face, and the surface feature of the second face is a plurality of grooves.

3. The plastic panel as claimed in claim 1, wherein the middle portion has a hollow room therein, and the hollow room is provided with a plurality of supporting ribs.

\* \* \* \* \*